United States Patent
Marwood

(10) Patent No.: US 9,691,138 B2
(45) Date of Patent: Jun. 27, 2017

(54) SYSTEM AND METHOD FOR ADJUSTING PIXEL SATURATION

(71) Applicant: Google Inc., Mountain View, CA (US)

(72) Inventor: David Marwood, Mountain View, CA (US)

(73) Assignee: Google Inc., Mountain View, CA (US)

( * ) Notice: Subject to any disclaimer, the term of this patent is extended or adjusted under 35 U.S.C. 154(b) by 293 days.

(21) Appl. No.: 14/014,592

(22) Filed: Aug. 30, 2013

(65) Prior Publication Data

US 2015/0062151 A1    Mar. 5, 2015

(51) Int. Cl.
- G09G 5/02 (2006.01)
- G06T 5/00 (2006.01)
- H04N 1/60 (2006.01)

(52) U.S. Cl.
CPC ........... G06T 5/008 (2013.01); H04N 1/6005 (2013.01); H04N 1/6027 (2013.01)

(58) Field of Classification Search
CPC ......... G06T 5/001; G06T 5/009; G06T 11/60; G06T 2207/20221; G06T 7/337; G09G 2320/0271; G09G 2320/0285; G06K 9/52; G06F 17/3028
See application file for complete search history.

(56) References Cited

U.S. PATENT DOCUMENTS

| | | | |
|---|---|---|---|
| 6,351,558 B1 | 2/2002 | Kuwata | |
| 6,731,794 B2 | 5/2004 | Zhang et al. | |
| 8,284,316 B2 | 10/2012 | Chiang et al. | |
| 2001/0014182 A1* | 8/2001 | Funayama et al. | 382/282 |
| 2003/0025835 A1 | 2/2003 | Segman | |
| 2005/0074180 A1* | 4/2005 | Wilensky | 382/254 |
| 2006/0188153 A1 | 8/2006 | Kempf et al. | |
| 2009/0087092 A1* | 4/2009 | Min et al. | 382/169 |
| 2010/0302347 A1* | 12/2010 | Shikata | H04N 5/232 348/36 |
| 2011/0110588 A1 | 5/2011 | Xie et al. | |
| 2013/0114894 A1* | 5/2013 | Yadav et al. | 382/167 |
| 2015/0156415 A1* | 6/2015 | Gallup | H04N 13/0282 348/36 |

FOREIGN PATENT DOCUMENTS

| | | |
|---|---|---|
| EP | 1 587 300 | 11/2005 |
| EP | 2 320 378 | 5/2011 |
| WO | WO 2008/053408 | 5/2008 |

* cited by examiner

*Primary Examiner* — James A Thompson
*Assistant Examiner* — Xilin Guo
(74) *Attorney, Agent, or Firm* — Dority & Manning, P.A.

(57) ABSTRACT

In one aspect, a computer-implemented method for adjusting pixel saturation may generally include accessing, by one or more computing devices, a target distribution function associated with at least one target image and an input distribution function associated with at least one input image. The target distribution function may define a target probability for a pixel saturation of each pixel within the target image(s). The input distribution function may define an input probability for an initial saturation value of each pixel within the input image(s), with the input image(s) differing from the target image(s). The method may also include associating, by the computing device(s), the initial saturation value of each pixel within the input image(s) with a target saturation value based on the input and target distribution functions and adjusting, by the computing device(s), the initial saturation value of each pixel within the input image(s) to the corresponding target saturation value.

19 Claims, 6 Drawing Sheets

SYSTEM AND METHOD FOR ADJUSTING PIXEL SATURATION

FIELD

The present subject matter relates generally to a system and method for adjusting pixel saturation and, more particularly, to a system and method for normalizing the pixel saturation of input images based on the pixel saturation of target images having one or more desired saturation characteristics.

BACKGROUND

The pixel saturation within an image generally relates to the vividness of the colors contained within the image. Specifically, each pixel within an image may have a saturation value associated the dominance of hue within the pixel color. In many instances, people prefer images with more saturated, vivid colors. Unfortunately, satellite and aerial images are often substantially under-saturated and, thus, lacks significant vivid colors. This is particularly true for satellite and aerial images taken at higher elevations, as the effects of atmospheric conditions tend to produce flat, non-vivid colors. As a result, it is often desirable to adjust the pixel saturation within such under-saturated images to levels at or above the saturation levels of the colors found in nature.

SUMMARY

Aspects and advantages of embodiments of the invention will be set forth in part in the following description, or may be obvious from the description, or may be learned through practice of the embodiments.

In one aspect, the present subject matter is directed to a computer-implemented method for adjusting pixel saturation. The method may generally include accessing, by one or more computing devices, a target distribution function associated with at least one target image and an input distribution function associated with at least one input image. The target distribution function may define a target probability for a pixel saturation of each pixel within the target image(s). The input distribution function may define an input probability for an initial saturation value of each pixel within the input image(s), with the input image(s_differing from the target image(s). The method may also include associating, by the computing device(s), the initial saturation value of each pixel within the input image(s) with a target saturation value based on the input and target distribution functions and adjusting, by the computing device(s), the initial saturation value of each pixel within the input image(s) to the corresponding target saturation value.

In another aspect, the present subject matter is directed to a system for adjusting pixel saturation. The system may generally include one or more computing devices having one or more processors and associated memory. The memory may store instructions that, when executed by the processor(s), configure the computing device(s) to access a target distribution function associated with at least one target image and an input distribution function associated with at least one input image. The target distribution function may define a target probability for a pixel saturation of each pixel within the target image(s). The input distribution function may define an input probability for a pixel saturation of each pixel within the input image(s), with the input image(s) differing from the target image(s). The computing device(s) may also be configured to determine the input probability for an input pixel within the input image(s) based on the input distribution function, wherein the input pixel has an initial saturation value. In addition, the computing device(s) may be configured to determine a target saturation value based on the target distribution function at which the target probability is equal to the input probability for the input pixel and adjust the pixel saturation of the input pixel from the initial saturation value to the target saturation value.

In a further aspect, the present subject matter is directed to a tangible, non-transitory computer-readable medium storing computer-executable instructions that, when executed by one or more processors, cause the processor(s) to perform specific operations. The operations may generally include accessing a target distribution function associated with at least one target image and an input distribution function associated with at least one input image. The target distribution function may define a target probability for a pixel saturation of each pixel within the target image(s). The input distribution function may define an input probability for an initial saturation value of each pixel within the input image(s), with the input image(s) differing from the target image(s). The operations may also include associating the initial saturation value of each pixel within the input image (s) with a target saturation value based on the input and target distribution functions and adjusting the initial saturation value of each pixel within the input image(s) to the corresponding target saturation value.

Other exemplary aspects of the present disclosure are directed to other methods, systems, apparatus, non-transitory computer-readable media, user interfaces and devices for adjusting the pixel saturation of a plurality of images.

These and other features, aspects and advantages of the various embodiments will become better understood with reference to the following description and appended claims. The accompanying drawings, which are incorporated in and constitute a part of this specification, illustrate embodiments of the invention and, together with the description, serve to explain the related principles.

BRIEF DESCRIPTION OF THE DRAWINGS

Detailed discussion of embodiments directed to one of ordinary skill in the art, are set forth in the specification, which makes reference to the appended figures, in which.

DETAILED DESCRIPTION

Figure 1:
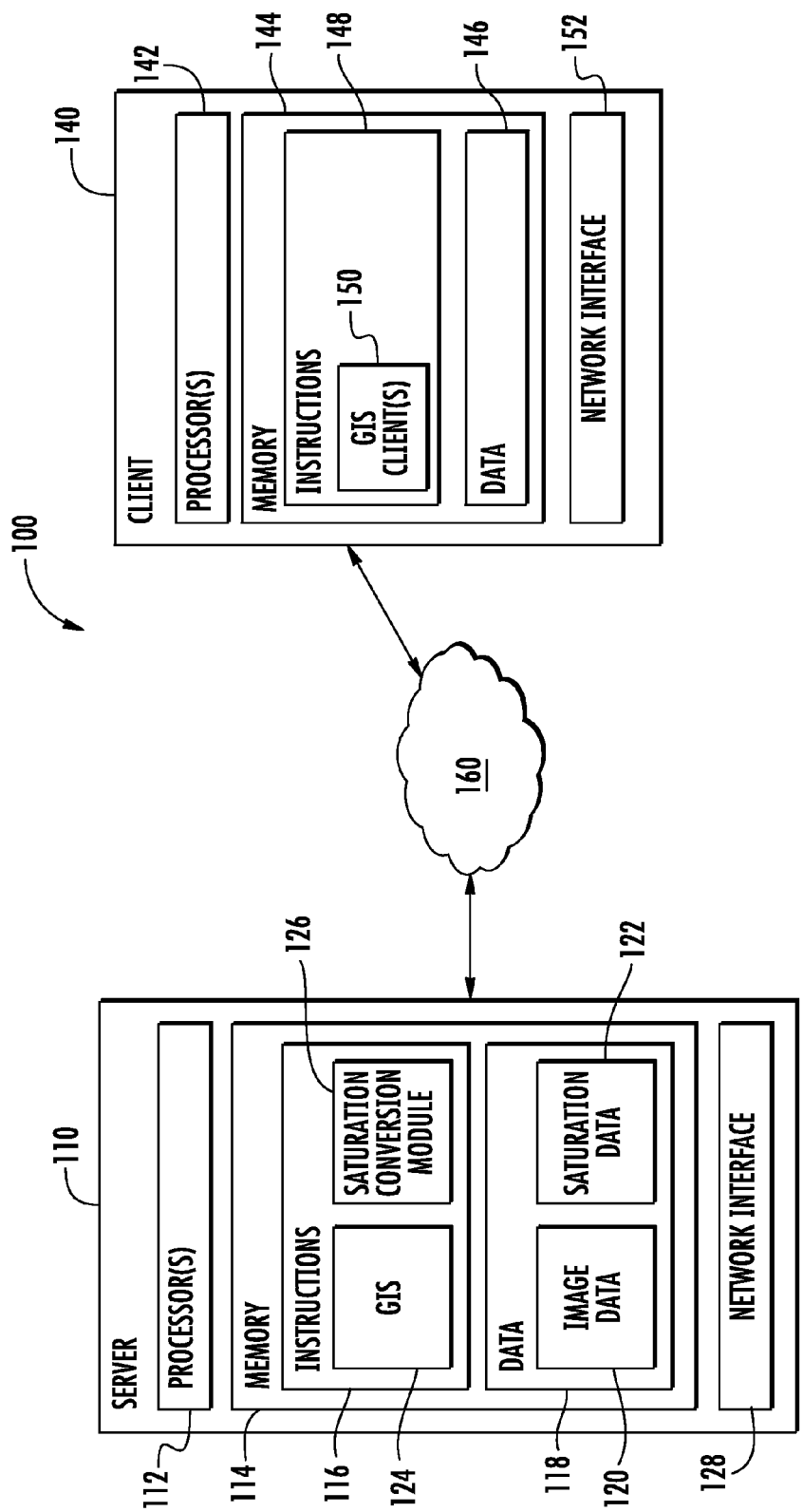
FIG. 1 illustrates a schematic diagram of one embodiment of a system for adjusting pixel saturation in accordance with aspects of the present subject matter.

Reference now will be made in detail to embodiments, one or more examples of which are illustrated in the drawings. Each example is provided by way of explanation of the embodiments, not limitation. In fact, it will be apparent to those skilled in the art that various modifications and variations can be made to the embodiments without departing from the scope or spirit of the embodiments. For instance, features illustrated or described as part of one embodiment can be used with another embodiment to yield a still further embodiment. Thus, it is intended that the present subject matter cover such modifications and variations as come within the scope of the appended claims and their equivalents.

In general, the present subject matter is directed to a system and method for adjusting the pixel saturation of a plurality of input images. Specifically, in several embodiments, the saturation values of the pixels contained within the input images may be adjusted based on the saturation values of pixels contained within a plurality of reference or target images having one or more desired saturation characteristics, such as a desired saturation distribution and/or desired saturation values. For example, cumulative distribution functions (CDFs) may be defined for the pixel saturations of both the target images and the input images. Thereafter, utilizing the CDFs, the saturation value for each pixel contained within the input images may be transformed or converted to a target saturation value, thereby allowing the cumulative distribution of the pixel saturations of the converted input images to match the cumulative distribution of the pixel saturations of the target images without otherwise altering the appearance of the input images.

In several embodiments, the disclosed system and method may be advantageously applied to satellite and/or aerial imagery. For example, as indicated above, aerial images are often under-saturated (especially images taken at higher altitudes) due to the effects of atmospheric conditions and, thus, typically contain flat, non-vivid colors. Thus, the present subject matter may be used to normalize the pixel saturation of such aerial images based on a different set of aerial images (e.g., target images) having desired saturation characteristics. For instance, the target images selected may correspond to aerial images taken at low altitudes such that the effect of atmospheric conditions on pixel saturation is minimized. The saturation values of the pixels contained within such target images may then be analyzed to define a target CDF for pixel saturation, which may be used for transforming the initial saturation values of the pixels contained within the under-saturated images to new, enhanced saturation values. In addition, similar sets of aerial images (e.g., sets of aerial images depicting the same landscape) may have varying saturations due to the fact that the images were captured at different times of the day or during different atmospheric conditions. In such instance, the system and method disclosed herein may be utilized to normalize the saturations of the differing sets of aerial images.

It should be appreciated that, when selecting a set of target images to be used for transforming the pixel saturation of a plurality of input images, it may be desirable for the content contained within the target images to be generally representative of the content contained within the input images. For instance, if the input images correspond to a set of aerial images within which 30% of the pixels are associated with the depiction of open fields and 20% of the pixels are associated with depiction of buildings, it may be desirable for the set of target images to contain similar pixel percentages. However, in several embodiments, it may be assumed that random images of the world are independent and identically distributed (IID). Specifically, for a large set of aerial images, it may be assumed that the images provide a sufficient approximation of IID pixels. In such instances, for any set of target aerial images, a sufficient variation in saturation may be provided to allow the pixel saturation for a set of input images to be properly transformed using the disclosed system and method.

It should also be appreciated that, although the present subject matter will be generally described herein with reference to adjusting the pixel saturation of satellite and/or aerial images, the disclosed system and method may generally be utilized to adjust the pixel saturation of any suitable images. For instance, the pixel saturation of images captured using conventional point and shoot cameras may also be adjusted using the disclosed system and method.

Additionally, it should be appreciated that the technology described herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer processes discussed herein may be implemented using a single computing device or multiple computing devices working in combination. Databases and applications may be implemented on a single system or distributed across multiple systems. Distributed components may operate sequentially or in parallel.

Referring now to the drawings, FIG. 1 illustrates one embodiment of a system 100 for adjusting pixel saturation in accordance with aspects of the present subject matter. As will be described below, the system 100 may allow for the pixel saturation of a plurality of input images to be normalized or otherwise transformed based on the pixel saturation of a plurality of target images.

As shown in FIG. 1, the system 100 may include a client-server architecture where a server 110 communicates with one or more clients, such as a local client device 140, over a network 160. The server 110 may generally be any suitable computing device, such as a remote web server(s) or a local server(s), and/or any suitable combination of computing devices. For instance, the server 110 may be implemented as a parallel or distributed system in which two or more computing devices act together as single server. Similarly, the client device 140 may generally be any suitable computing device(s), such as a laptop(s), desktop(s), smartphone(s), tablet(s), mobile device(s), wearable computing device(s), a display with one or more processors coupled thereto and/or embedded therein and/or any other computing device(s). Although a single client device 140 is shown in FIG. 1, it should be appreciated that any number of clients may be connected to the server 110 over the network 160.

In several embodiments, the server 110 may host a GIS 124, such as a mapping application (e.g. the Google Maps mapping services provided by Google Inc.), a virtual globe application (e.g. the Google Earth virtual globe application provided by Google Inc.), or any other suitable geographic information system. On the client-side, the client device 140 may present a user interface that allows a user to interact with the GIS 124. For instance, the user interface may be served through a network or web-based application that is executed on the client device 140, such as a web browser, a thin client application or any other suitable network or web-based application or the user interface may be served locally on the client device 140. The server 110 may transmit geospatial data, such as satellite and/or aerial imagery and other data (e.g., terrain and vector data), over the network 160 to the client device 140. Upon receipt of this data, the client device 140 may render the geospatial data, via the user interface, in a display device associated with the client device 140. A user may then access and/or interact with the data presented in the user interface.

As shown in FIG. 1, the server 110 may include a processor(s) 112 and a memory 114. The processor(s) 112 may be any suitable processing device, such as a microprocessor, microcontroller, integrated circuit, or other suitable processing device. Similarly, the memory 114 may include any suitable computer-readable medium or media, including, but not limited to, non-transitory computer-readable media, RAM, ROM, hard drives, flash drives, or other memory devices. The memory 114 may store information accessible by processor(s) 112, including instructions 116 that can be executed by processor(s) 112 and data 118 that can be retrieved, manipulated, created, or stored by processor(s) 112. In several embodiments, the data 118 may be stored in one or more databases.

For instance, as shown in FIG. 1, the memory 114 may include an image database 120 for storing image files associated with a plurality of images. As will be described below, such images may correspond to a plurality of target images having one or more desired saturation characteristics. For example, the target images may be selected based on the presence of a desired saturation distribution across the pixels contained within the images. In addition, the images stored within the image database 120 may also correspond to a plurality of input images having saturation characteristics that are desired to be and/or that have already been transformed based on the saturation characteristics of the target images. For instance, images taken by satellite and/or aerial imaging equipment may be stored within the image database 120 as input images. As indicated above, satellite and aerial images are often under-saturated, especially those taken at higher altitudes. Thus, in accordance with aspects of the present subject, the under-saturated images may be stored within the image database 120 and the pixel saturation of such input images may be subsequently transformed based on the pixel saturation of the target images. The transformed input images may then be made available to one or more client devices 140, such as by serving the transformed input images as part of a geospatial asset (e.g., a 3-D globe or 2-D map) made available via the GIS 124 hosted by the server 110.

The memory 114 may also include a saturation database 122 for storing data associated with the pixel saturation of any suitable images, including any images stored within the image database 120. For instance, saturation values for each pixel contained within the target images and/or the input images may be stored within the saturation database 122. In addition, various other types of data associated with the saturation characteristics of the images may also be stored within the saturation database 122, such as histogram data, probability density functions and/or cumulative density functions (CDFs) related to the pixel saturation of the target images and/or the input images. Moreover, as will be described below, one or more reference or look-up tables may also be stored within the saturation database 122 for converting the initial saturation values of the pixels contained within the input images to new, target saturation values.

It should be appreciated that the saturation value for each pixel contained within the target images and/or the input images may be initially determined using any suitable means and/or method known in the art. For instance, if the images stored within the image database 120 are represented using an RGB color model, the saturation values for each pixel may be obtained by converting the color model to an HSV color model (or any other suitable color model) using known conversion algorithms and techniques.

In several embodiments, the instructions 116 stored within the memory 114 may be executed by the processor(s) 112 to implement a saturation conversion module 126. In general, the saturation conversion module 126 may be configured to adjust the pixel saturation of each pixel contained within the input images to a target pixel saturation based on the saturation distribution of the target images. For instance, a given input pixel within the input images may have an initial saturation value (e.g., a value ranging from 0 to 1 or from 0 to 55). As will be described below, by accessing the data stored within the saturation database 122 (e.g., the CDF(s) or the look-up table(s)), the saturation conversion module 126 may be configured to determine a target saturation value for such input pixel. The module 126 may then adjust the initial saturation value to the corresponding target saturation value. By converting the saturation value for each pixel contained within input images to a corresponding target saturation value, the saturation characteristics of the input images may be transformed to those of the target images.

Additionally, as indicated above, the server 110 may, in several embodiments, be configured to host a GIS 124 that allows the server to communicate with a corresponding GIS client(s) 150 running on the client device 140. Thus, in response to access requests transmitted by the client device 140, geospatial data, including satellite and/or aerial imagery, may be transmitted to and rendered by the client device 140. In such embodiments, the imagery rendered by the client device 140 may correspond to one or more input images for which the pixel saturation has been adjusted based on the saturation distribution of the corresponding target images.

It should be appreciated that, as used herein, the term "module" refers to computer logic utilized to provide desired functionality. Thus, a module may be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, ROM, hard disk or optical or magnetic media.

Additionally, as shown in FIG. 1, the server 110 may also include a network interface 128 for providing communications over the network 160. In general, the network interface 128 may be any device/medium that allows the server 110 to interface with the network 160.

Similar to the server 110, the client device 140 may also include one or more processors 142 and associated memory 144. The processor(s) 142 may be any suitable processing device known in the art, such as a microprocessor, microcontroller, integrated circuit, or other suitable processing device. Similarly, the memory 144 may be any suitable computer-readable medium or media, including, but not limited to, non-transitory computer-readable media, RAM, ROM, hard drives, flash drives, or other memory devices. As is generally understood, the memory 144 may be configured to store various types of information, such as data 146 that may be accessed by the processor(s) 142 and instructions 148 that may be executed by the processor(s) 142. The data 146 may generally correspond to any suitable files or other data that may be retrieved, manipulated, created, or stored by processor(s) 142. In several embodiments, the data 146 may be stored in one or more databases.

The instructions 148 stored within the memory 144 of the client device 140 may generally be any set of instructions that, when executed by the processor(s) 142, cause the processor(s) 142 to provide desired functionality. For example, the instructions 148 may be software instructions rendered in a computer readable form or the instructions may be implemented using hard-wired logic or other circuitry. In several embodiments, suitable instructions may be stored within the memory 144 for implementing one or more GIS clients 150, such as one or more earth-browsing clients and/or mapping clients, designed to render the geospatial data (including satellite and/or aerial imagery) associated with the geospatial assets available via the GIS 124. For instance, the GIS client(s) 150 may be configured to retrieve imagery data from the server 110 and render such images for display/use by the user.

Moreover, as shown in FIG. 1, the client device 140 may also include a network interface 152 for providing communications over the network 160. Similar to the interface 128 for the server 110, the network interface 152 may generally be any device/medium that allows the client device 140 to interface with the network 160.

It should be appreciated that the network 160 may be any type of communications network, such as a local area network (e.g. intranet), wide area network (e.g. Internet), or some combination thereof. The network can also include a direct connection between the client device 140 and the server 110. In general, communication between the server 110 and the client device 140 may be carried via a network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Figure 2:
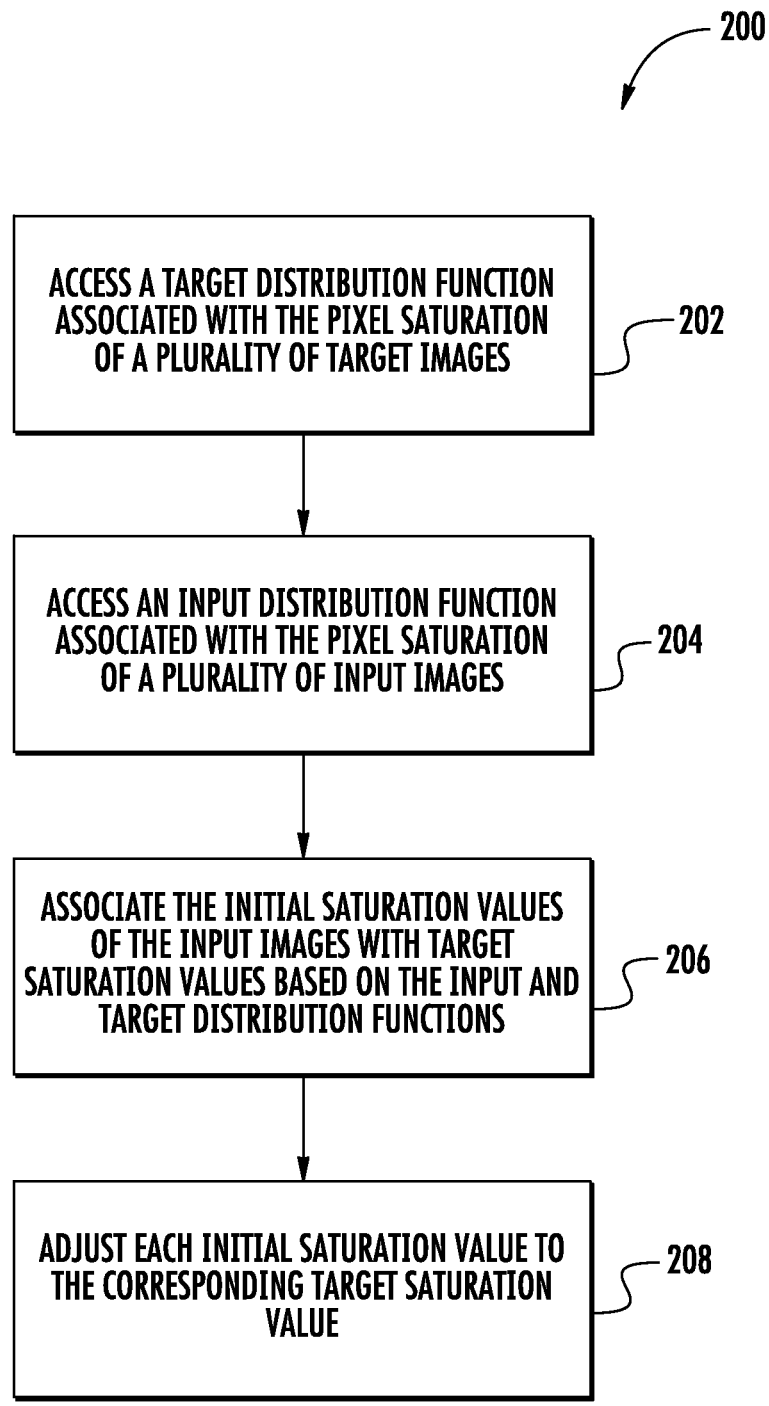
FIG. 2 illustrates a flow diagram of one embodiment of a method for adjusting pixel saturation in accordance with aspects of the present subject matter.

Referring now to FIG. 2, a flow diagram of one embodiment of a method for adjusting the pixel saturation of a plurality images is illustrated in accordance with aspect of the present subject matter. The method 200 will generally be discussed herein with reference to the system 100 shown in FIG. 1. However, those of ordinary skill in the art, using the disclosures provided herein, should appreciate that the methods described herein may be executed by any computing device or any combination of computing devices. Additionally, it should be appreciated that, although the method elements 202-208 are shown in FIG. 2 in a specific order, the various elements of the disclosed method 200 may generally be performed in any suitable order that is consistent with the disclosure provided herein.

As shown in FIG. 2, at (202), the method 200 includes accessing a target distribution function associated with the pixel saturation of a plurality of target images. As indicated above, the server 110 may include an image database 120 for storing data associated with a plurality of images, including a plurality of target images having one or more desired saturation characteristics. For instance, target images may be selected that have desired pixel saturation distributions and may be subsequently stored on the image database 120. In several embodiments, different sets of target images may be stored and/or defined within the image database 120. For example, target images may be grouped based on content so that a specific target image group may be selected that provides a sufficient representation of the content contained within any input images being transformed using the disclosed method 200.

Figure 3:
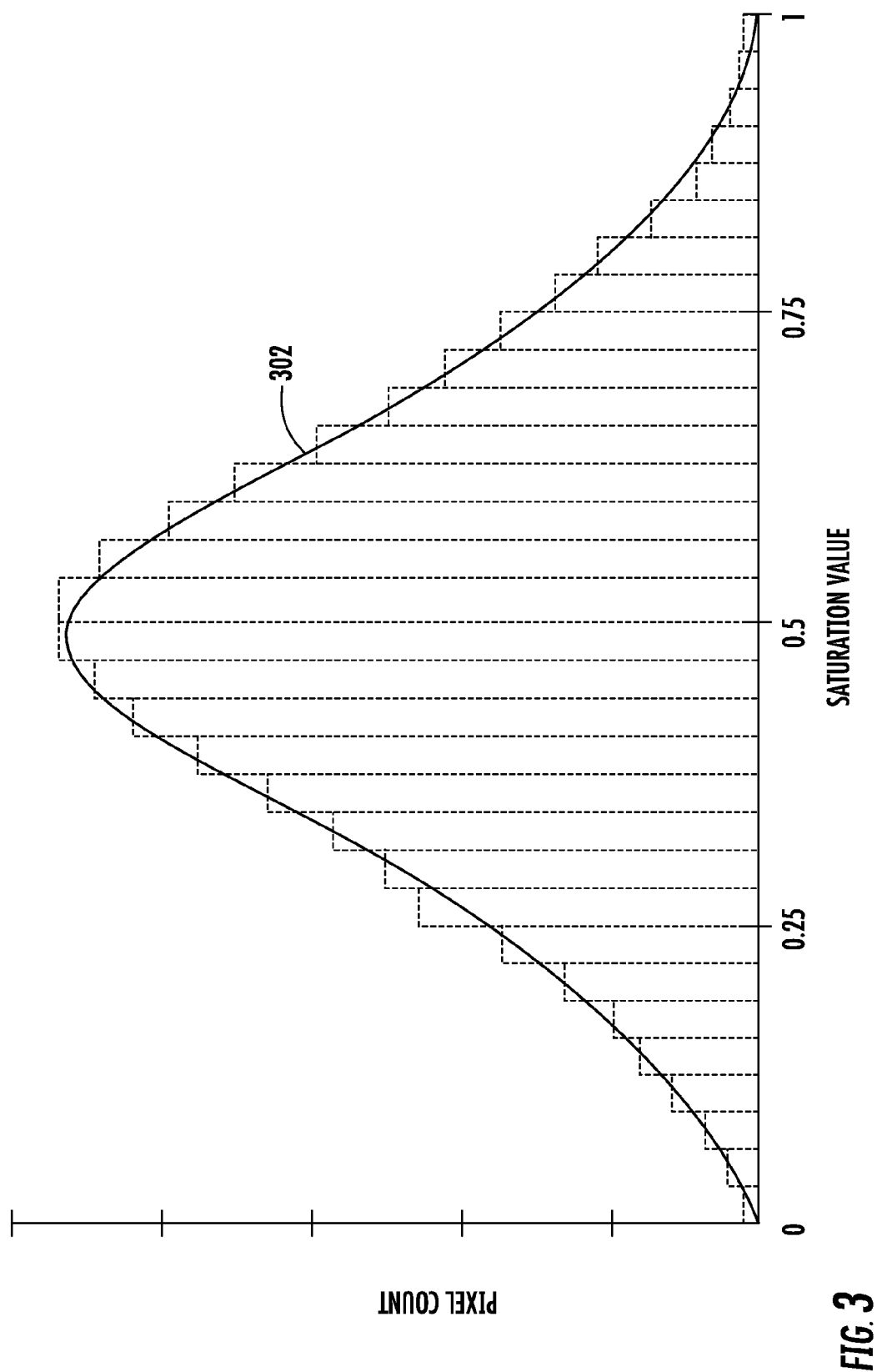
FIG. 3 illustrates a histogram charting saturation values for an example set of target images.

In several embodiments, to define the target distribution function (referred to hereinafter as the target CDF), the saturation values of the pixels contained within the target images may be initially analyzed to define a probability density function for such images. For example, FIG. 3 illustrates a histogram of the saturation values for pixels contained within an example set of target images. As shown, at each saturation value (or at each individual range of saturation values represented by the dashed boxes), the number of pixels having such saturation value (or having a saturation value falling within an individual range of values) may be stored. The histogram data may then be used to define the probability density function for the target images. For instance, as shown in FIG. 3, a best-fit curve 302 may be defined that serves as an approximation or representation of the probability density function of the distribution of the pixel saturation for the target images.

Figure 5:
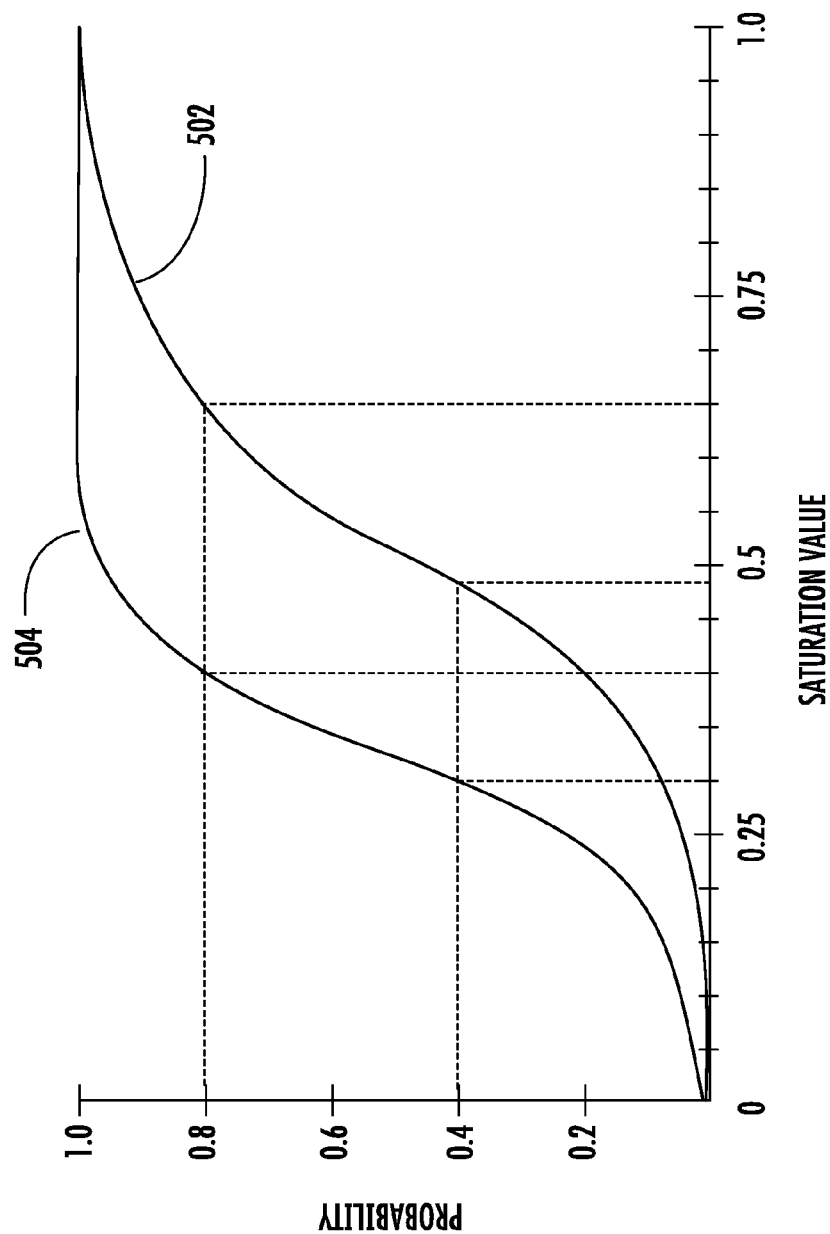
FIG. 5 illustrates cumulative distribution functions associated with the saturation values shown in FIGS. 3 and 4, particularly illustrating a cumulative distribution function of the pixel saturations within the example set of target images and a cumulative distribution function of the pixel saturations within the example set of input images.

The probability density function may, in turn, be used to define the target CDF for the images (e.g., by taking the integral of the probability density function). For example, FIG. 5 illustrates the target CDF (curve 502) obtained using the histogram data of FIG. 3. As shown, the target CDF 502 defines the percentile or probability (y-axis) that a particular pixel within the target images will have a saturation value (x-axis) that is less than or equal to a given saturation value. For instance, using the example data shown in FIG. 5, 80% of the pixels contained within the target images have a saturation value that is less than or equal to about 0.65 while 40% of the pixels have a saturation value that is less than or equal to about 0.475.

Referring back to FIG. 2, at (204), the method 200 includes accessing an input distribution function associated with the pixel saturation for a plurality of input images. As indicated above, the image database 120 of the server 110 may be configured to store a plurality of input images. The input images may, in several embodiments, correspond to images having saturation characteristics that are less desirable than the saturation characteristics of the target images. For instance, the input images may correspond to under-saturated satellite or aerial imagery (e.g., images taken at high altitudes). In such instance, it may be desirable to normalize or otherwise transform the pixel saturation of the input images based on the pixel saturation of the target images.

Figure 4:
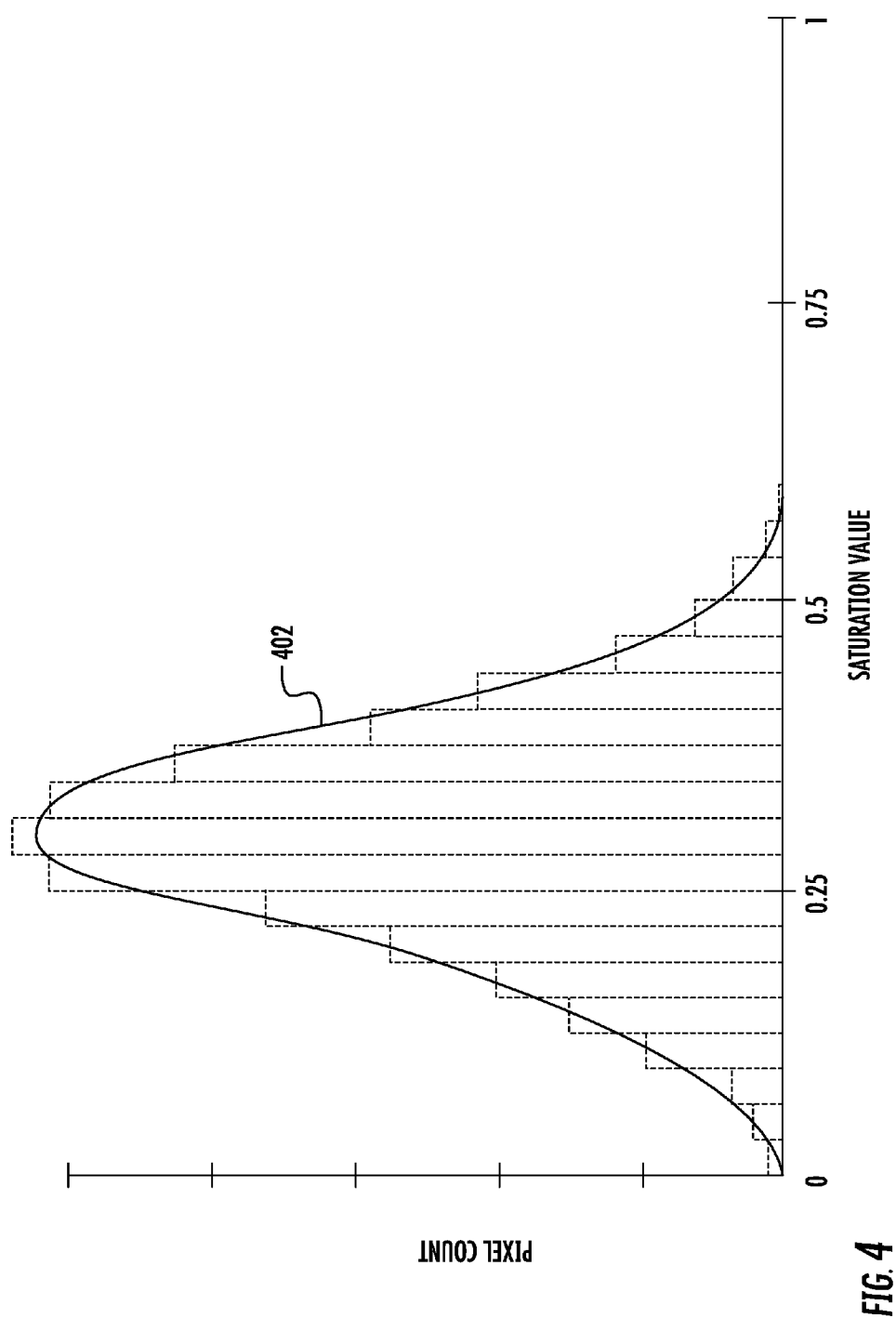
FIG. 4 illustrates a histogram charting saturation values for an example set of input images.

Similar to the target images, the saturation values of the pixels contained within the input images may be analyzed to define an input distribution function for such images (hereinafter referred to as the input CDF). For instance, FIG. 4 illustrates a histogram of the saturation values for pixels contained within an example set of input images. As shown, the histogram data corresponds to input images having under-saturated pixels and, thus, the data differs significantly from that of the target images. Using the histogram data, a probability density function may be defined for the input images (e.g., such as by defining a best-fit curve 402 based on the data), which may then be used to define the input CDF. For example, FIG. 5 illustrates the input CDF (curve 504) obtained based on the histogram data of FIG. 4. As shown, due to the under-saturated input images, the input CDF 504 is shifted to the left compared to the target CDF 502. For instance, unlike the target images in which 80% of the pixels have a saturation value that is less than or equal to about 0.65, 80% of the pixels contained within the input images have a saturation value that is less than or equal to about 0.4. Similarly, unlike the target images in which 40% of the pixels have a saturation value that is less than or equal to about 0.475, 40% of the pixels contained within the input images have a saturation value that is less than or equal to about 0.3.

It should be appreciated that, although the present subject matter is generally described herein as using a plurality of target and input images, the techniques disclosed herein may also be applicable when only a single target image and/or a single input image exists. For instance, instead of being based on a plurality of target images, the target CDF may be defined based on the saturation values contained within a single target image. Similarly, the input CDF may be defined based on the saturation values contained within a single input image.

Referring back to FIG. 2, at (206), the method 200 includes associating the initial saturation values of the pixels within the plurality of input images with target saturation values based on the input and target distribution functions. Specifically, as indicated above, each input pixel of the input images may have an initial saturation value. Using this initial saturation value, an input probability (e.g., the probability that the pixel saturation of an input pixel is less or equal to a given saturation value) for each input pixel may be determined based on the input CDF. For instance, referring to example data shown in FIG. 5, for an input pixel having a saturation value of about 0.3, the input probability associated with the pixel is equal to about 0.4. Thereafter, a target saturation value for the input pixel may be determined based on the target CDF and the corresponding input probability. Specifically, in several embodiments, the target saturation value may be selected based on the saturation value at which the target probability (e.g., the probability that the pixel saturation of a pixel of the target images is less or equal to a given saturation value) is equal to the input probability for the input pixel. For instance, referring again to example data shown in FIG. 5, for a probability value of about 0.4, the corresponding target saturation value is about 0.475.

Upon associating the initial saturation values with target saturation values, at (210), the method 200 includes adjusting the pixel saturation for each input pixel from its initial saturation value to the target saturation value. For instance, in the example described above with reference to FIG. 5, for an input pixel having an initial saturation value of 0.3, the saturation value may be adjusted to a target saturation value of 0.475. By similarly converting or transforming the pixel saturation of each pixel contained within the input images from its initial saturation value to a corresponding target saturation value, the distribution of pixel saturations for the input images may be transformed to the same distribution of pixel saturations for the target images without otherwise altering the appearance of the input images.

It should be appreciated that the graphical representations of the example data shown in FIGS. 3-5 are simply provided for explanation purposes. In simple terms, a function may be defined for the target CDF (e.g., tcdf(x)) that maps target pixel saturation values to the portion of pixels contained within the target images having a saturation value less than or equal to a given saturation value (e.g., the target probability). Similarly, a function may be defined for the input CDF (e.g., icdf(x)) that maps input pixel saturation values to the portion of pixels contained within the input images having a saturation value less than or equal to a given saturation value (e.g., the input probability). In addition, an inverse function may be defined for the target CDF (e.g., tcdf_inv(y)) that maps the target probabilities to the corresponding target saturation values. Thus, to transform the initial saturation value of an input pixel to a corresponding target saturation value using the above described functions, the function tcdf_inv(icdf(x)) may be utilized, wherein x is the initial saturation value.

It should also be appreciated that, in several embodiments, one or more reference or look-up tables may be created that correlates the initial saturation values of the input images to target saturation values. For instance, the server 110 may be configured to iterate over all the potential input saturation values to define corresponding target saturation values. Thus, by determining the initial saturation value of an input pixel of the input images, the look-up table(s) may be referenced to quickly determine the corresponding target saturation value.

Additionally, in several embodiments, a saturation modifier may be utilized to modify the target saturation values represented by the target CDF. For instance, it may be desirable to increase or decrease the pixel saturation of the target CDF to alter the corresponding distribution achieved within the transformed input images (e.g., to create a synthetic saturation distribution). Thus, the saturation modifier may generally correspond to any suitable correction factor or formula used to modify the target saturation values. For instance, the modifier may correspond to a specific number used as a multiplier or divider to adjust the target saturation values, such as by using a multiplier of two to double the target saturation values. In such instance, to avoid overflow when using a multiplier as the modifier, a minimum function may be utilized so that the resulting target saturation value is equal to min(tcdf(x)*m, z), wherein m corresponds to the multiplier and z corresponds to the maximum saturation value (e.g., 1 or 55).

Figure 6:
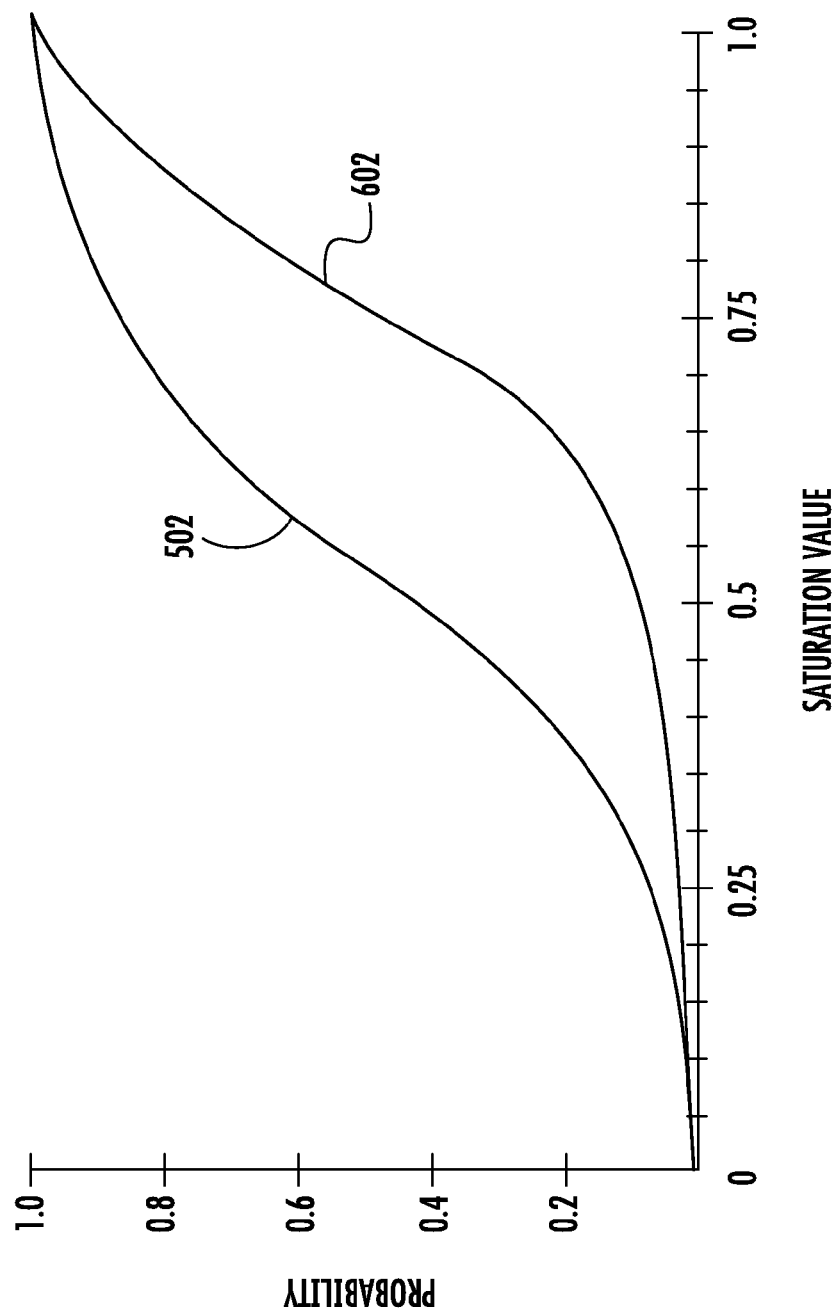
FIG. 6 illustrates the cumulative distribution function shown in FIG. 5 for the pixel saturations within the target images before and after modification using a saturation modifier.

As another example, the saturation modifier may be associated with fitting the target saturation values along a gamma curve. For instance, FIG. 6 illustrates both the target CDF (curve 502) shown in FIG. 502 and an enhanced target CDF (curve 602) having a gamma correction of 2 (e.g., by raising the target saturation values within the target CDF 502 to the ½ power) such that the modified target saturation values are equal to tcdf(x)^0.5. As shown, with such a gamma correction, the largest increase in saturation value is at the middle of the saturation range (e.g., at a saturation value of 0.5 for saturation values ranging from 0 to 1.0).

As an alternative to modifying all the target saturation values using the saturation modifier, it may be desirable to only modify a portion of the saturation values. For instance, persons may be more sensitive to pixel saturations within one or more specific saturation values ranges. In such instance, the saturation modifier may be utilized to modify the target saturation values contained with such range(s).

It should be appreciated that, although the target CDF has been described herein as being defined based on a plurality of target images, the target CDF may, in alternative embodiments, be defined based on any other suitable data and/or process. For instance, the target CDF may be entirely synthetic, such as by being created to achieve some ideal or preferred look rather than to comply with (or even be a function of) any real-world imagery. In such instance, the target CDF may, for example, be defined based on saturation values obtained via experimentation using a suitable image editing software.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for adjusting pixel saturation, the method comprising:
   accessing, by one or more computing devices, a target distribution function associated with at least one target aerial image, the target distribution function defining a target probability for a pixel saturation of each pixel within the at least one target aerial image;
   accessing, by the one or more computing devices, an input distribution function associated with at least one input aerial image, the input distribution function defining an input probability for an initial saturation value of each pixel within the at least one input aerial image, the at least one input aerial image depicting an aerial view of an entirely different geographic area than the at least one target aerial image such that content contained within the at least one input aerial image differs from content contained within the at least one target aerial image, the input distribution function differing from the target distribution function such that a pixel saturation distribution for the at least one input aerial image differs from a pixel saturation distribution for the at least one target aerial image;
   determining, by the one or more computing devices, the input probability associated with the initial saturation value of each pixel within the at least one input aerial image based on the input distribution function;
   determining, by the one or more computing devices, a target saturation value based on the target distribution function at which the target probability is equal to the input probability for the corresponding initial saturation value, the target saturation value differing from the corresponding initial saturation value; and
   adjusting, by the one or more computing devices, the initial saturation value of each pixel within the at least one input aerial image to the corresponding target saturation value.

2. The method of claim 1, further comprising analyzing, by the one or more computing devices, the target saturation value of each pixel within the at least one target aerial image to define the target distribution function.

3. The method of claim 1, further comprising analyzing, by the one or more computing devices, the initial saturation value of each pixel within the at least one input aerial image to define the input distribution function.

4. The method of claim 1, further comprising modifying, by the one or more computing devices, the target saturation values within the target distribution function using a saturation modifier.

5. The method of claim 1, wherein, although the at least one target aerial image and the at least one input aerial image contain differing, content, the content contained within the at least one target aerial image is generally representative of the content contained within the at least one input aerial image with reference to the types of geographic features contained within each image.

6. A system for adjusting pixel saturation, the system comprising:
   one or more computing devices including one or more processors and associated memory, the memory storing instructions that, when executed by the one or more processors, configure the one or more computing devices to:
      access a target distribution function associated with at least one target aerial image, the target distribution function defining a target probability for a pixel saturation of each pixel within the at least one target aerial image;
      access an input distribution function associated with at least one input aerial image, the input distribution function defining an input probability for a pixel saturation of each pixel within the at least one input aerial image, the at least one input aerial image depicting an aerial view of an entirely different geographic area than the at least one target aerial image such that content contained within the at least one input aerial image differs from content contained within the at least one target aerial image, the input distribution function differing from the target distribution function such that a pixel saturation distribution for the at least one input aerial image differs from a pixel saturation distribution for the at least one target aerial image;
      determine the input probability for an input pixel within the at least one input aerial image based on the input distribution function, the input pixel having an initial saturation value;
      determine a target saturation value based on the target distribution function at which the target probability is equal to the input probability for the input pixel, the target saturation value differing from the initial saturation value; and
      adjust the pixel saturation of the input pixel from the initial saturation value to the target saturation value.

7. The system of claim 6, wherein the one or more computing devices are further configured to analyze the target saturation value of each pixel within the at least one target aerial image to define the target distribution function.

8. The system of claim 6, wherein the one or more computing devices are further configured to analyze the initial saturation value of each pixel within the at least one input aerial image to define the input distribution function.

9. The system of claim 6, wherein the one or more computing devices are further configured to adjust the initial saturation value of each pixel within the at least one input aerial image to a corresponding target saturation value based on the input and target distribution functions.

10. The system of claim 6, wherein the one or more computing devices are further configured to modify the target saturation value using, a saturation modifier.

11. The system of claim 6, wherein, although the at least one target aerial image and the at least one input aerial image contain differing content, the content contained within the at least one target aerial image is generally representative of the content contained within the at least one input aerial image with reference to the types of geographic features contained within each image.

12. A tangible, non-transitory computer-readable medium storing computer-executable instructions that, when executed by one or more processors, cause the one or more processors to perform operations, comprising:
   accessing a target distribution function associated with at least one target aerial image, the target distribution function defining a target probability for a pixel saturation of each pixel within the at least one target aerial image;
   accessing an input distribution function associated with at least one input aerial image, the input distribution function defining an input probability for an initial saturation value of each pixel within the at least one input aerial image, the at least one input aerial image depicting an aerial view of an entirely different geographic area than the at least one target aerial image such that content contained within the at least one input aerial image differs from content contained within the at least one target aerial image, the input distribution function differing from the target distribution function such that a pixel saturation distribution for the at least one input aerial image differs from a pixel saturation distribution for the at least one target aerial image;

determining the input probability associated with the initial saturation value of each pixel within the at least one input aerial image based on the input distribution function;

determining a target saturation value based on the target distribution function at which the target probability is equal to the input probability for the corresponding initial saturation value, the target saturation value differing from the corresponding initial saturation value; and adjusting the initial saturation value of each pixel within the at least one input aerial image to the corresponding target saturation value.

13. The computer readable medium of claim 12, further comprising the operation of analyzing the target saturation value of each pixel within the at least one target aerial image to define the target distribution function.

14. The computer readable medium of claim 12, further comprising the operation of analyzing the initial saturation value of each pixel contained within the at least one input aerial image to define the input distribution function.

15. The computer readable medium of claim 12, further comprising the operation of modifying the target saturation values within the target distribution function using a saturation modifier.

16. The computer readable medium of claim 12, wherein, although the at least one target aerial image and the at least one input aerial image contain differing content, the content contained within the at least one target aerial image is generally representative of the content contained within the at least one input aerial image with reference to the types of geographic features contained within each image.

17. The method of claim 4, wherein modifying the target saturation values within the target distribution function using a saturation modifier comprises fitting the target saturation values along a gamma curve.

18. The system of claim 10, wherein the one or more computing devices are configured to modify the target saturation value by fitting the target saturation value along a gamma curve.

19. The computer readable medium of claim 15, wherein modifying the target saturation values within the target distribution function using a saturation modifier comprises fitting the target saturation values along a gamma curve.

* * * * *